March 21, 1967 — J. GREISSMAN — 3,310,810
NUMBERING MARKER FOR A RECORDER

Filed April 30, 1965 — 3 Sheets-Sheet 1

INVENTOR.
JACOB GREISSMAN
BY William Wolfe
ATTORNEY

INVENTOR.
JACOB GREISSMAN
BY William Wolfe
ATTORNEY

March 21, 1967  J. GREISSMAN  3,310,810
NUMBERING MARKER FOR A RECORDER
Filed April 30, 1965  3 Sheets-Sheet 3
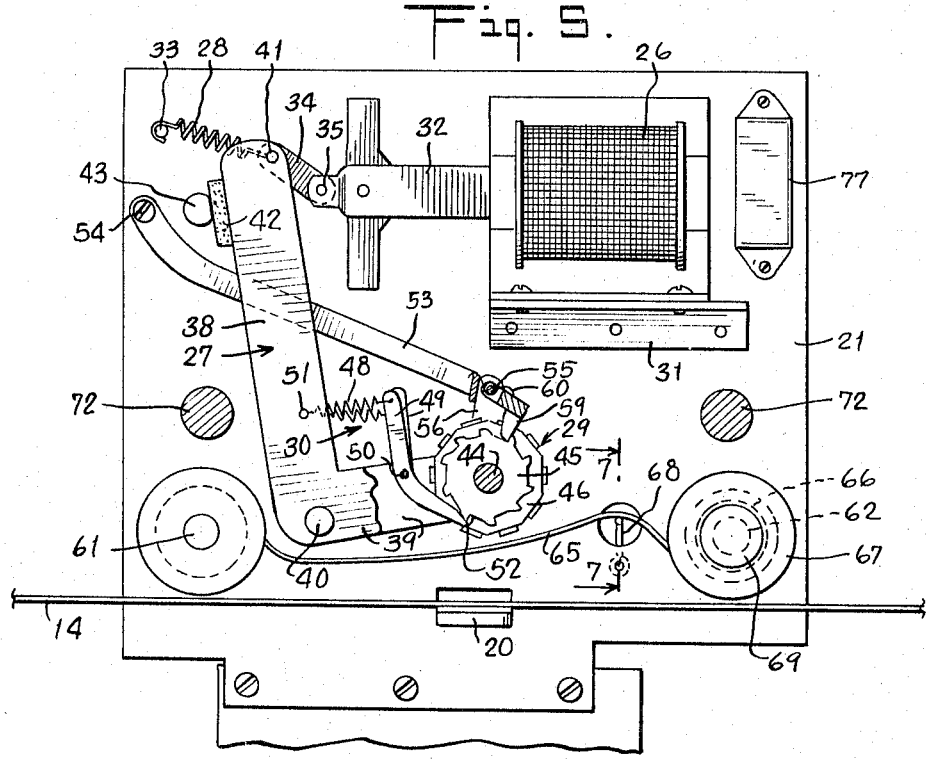
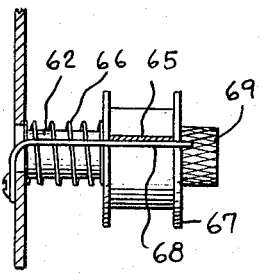
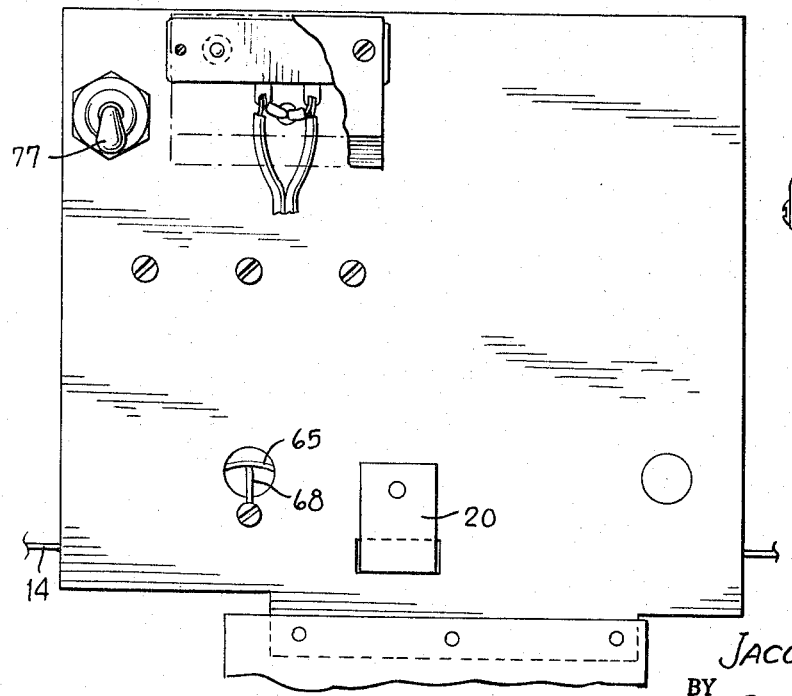
INVENTOR.
JACOB GREISSMAN
BY William Wolfe
ATTORNEY

United States Patent Office 3,310,810
Patented Mar. 21, 1967

3,310,810
NUMBERING MARKER FOR A RECORDER
Jacob Greissman, Brooklyn, N.Y. (285 West End Ave., Apt. 3 V-E, New York, N.Y. 10023)
Filed Apr. 30, 1965, Ser. No. 452,089
3 Claims. (Cl. 346—98)

My invention relates to numbering machines, and more specifically to a simple numbering machine suitable for functioning on and with a potentiometer.

The numbering machines at present in use are cumbersome, large and create a vibration when in use and are unsuitable for positioning on and working with delicate instruments such as a potentiometer. As is well known, the potentiometer has a delicate, sensitive pen which is easily disturbed by vibration, causing a distorted, unusable graph to result and possibly injuring the graph paper and the pen itself. It is therefore essential, if a numbering machine is to be used in conjunction with a potentiometer, that the machine be able to function so as not to disturb the potentiometer needle and other of its elements, and to work quietly and gently, and its marking elements not to strike with any degree of force against any part of the potentiometer.

A further object is to create an indicator marker which can be intermittently operated at the will of the user. Also an object is to create a device which is suitable for use with a potentiometer to code mark the potentiometer graph paper at significant places corresponding to the operation of the potentiometer pen.

With these requisites in mind, I have created a numbering machine which is simple and inexpensive to construct, compact and small in size and which is easily assembled on the potentiometer so that the potentiometer graph paper tape can be marked or numbered at proper or desired intervals corresponding to the movement or action of the pen on the tape.

In addition, a further object is to create a potentiometer and numbering machine in which the numbering section uses its own anvil.

Another object is to form a device which can be attached to a potentiometer and which will mark a tape at the same time that the potentiometer pen is drawing its curve on the tape.

I accomplish these and other objects by forming my potentiometer indicator marker of a base plate, an anvil, a solenoid, a spring, a reciprocable L bar, an inked ribbon, all said elements being secured to said base plate, and a ratchet having a numbering wheel, said L bar being pinned to the solenoid plunger and secured to the spring and reciprocably operable by them, said ratchet being rotatably secured to and carried by one end of the L bar and being so positioned on the L bar as to have one of its numbers capable of gently engaging or striking the anvil when the solenoid bar reaches the end of its stroke and said inked ribbon partly resting between the anvil and the ratchet numbering wheel, and said base plate having a projecting flange capable of being secured to the potentiometer at such a location that the anvil rests below and the inked ribbon above the potentiometer paper and the numbered wheel above the potentiometer paper and aligned with the pen of the potentiometer.

For further comprehension of the invention and of the objects and advantages thereof, reference will be had to the following description, the accompanying drawings and the appended claims in which novel features of the invention are more particularly set forth.

In the drawings forming a material part of this disclosure:

FIG. 5 is a front view of the indicator marker with its cover removed to show its functioning elements.

FIG. 6 is a rear view of the indicator marker, and

FIG. 7 is a sectional view along the line 7—7 of FIG. 5 and shows an inked ribbon and one of its spools.

Figure 1:
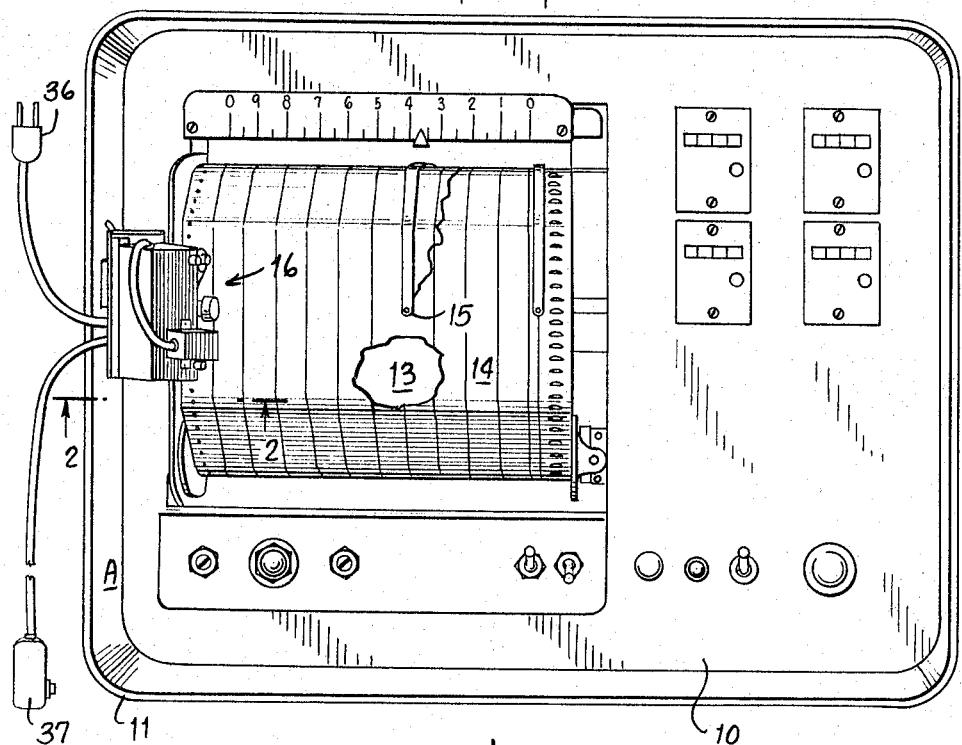
FIG. 1 is a plan view of the upper surface of a potentiometer with my indicator marker attached.
Figure 2:
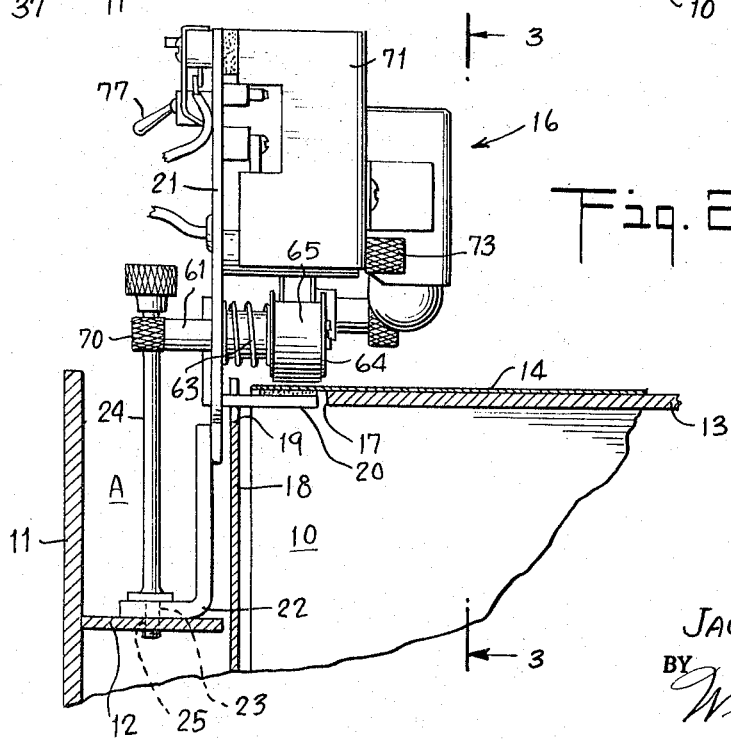
FIG. 2 is a sectional view along the line 2—2 of the potentiometer showing an end view of the indicator marker.
Figure 3:
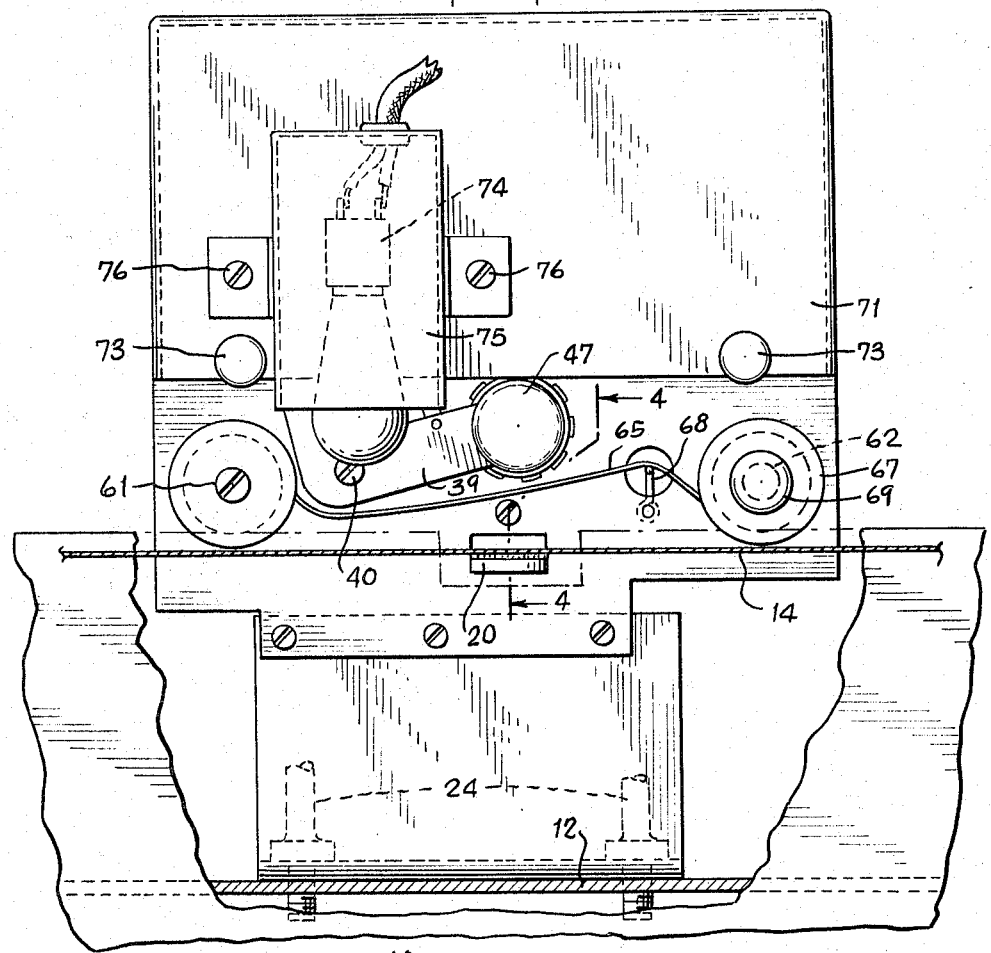
FIG. 3 is a side view of the potentiometer partly broken away to show a front view of the indicator marker.
Figure 4:
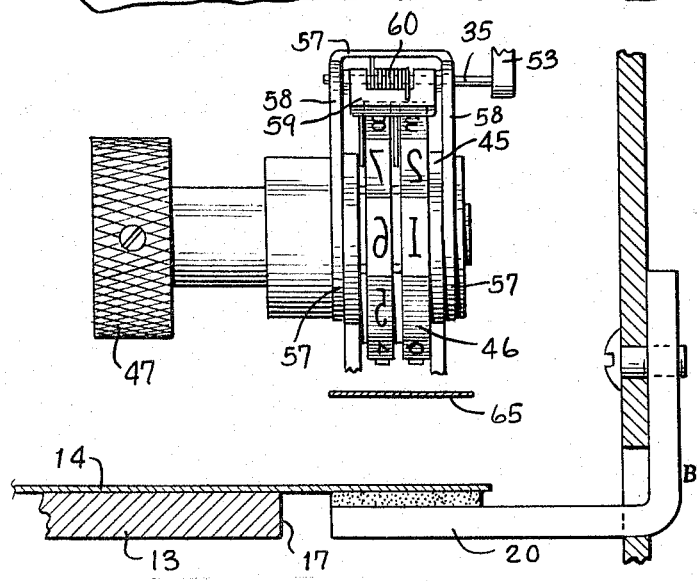
FIG. 4 is a sectional view along the line 4—4 of FIG. 3 and shows the ratchet and numbering wheels of the indicator marker.

In the drawing and in the specification in which similar numbers indicate like elements, a potentiometer 10 is shown encased in an outer frame 11, with a well or open area A therebetween. Extending in the well A is a bracket 12 of the outer frame 11. The potentiometer 10, as usual, is provided with a flat plate or writing surface 13 over which graph paper 14 travels and with a pen 15 operable by the potentiometer elements to mark its graph paper. In order to permit my indicator marker 16 to be functionally positioned on the potentiometer and not interfere with its working, the flat plate 13 of the potentiometer is cut out at 17 and part of the inner side wall 18 of the potentiometer is cut out at 19. In the space thus provided, there is positioned an anvil 20 of the indicator marker, care being taken, however, to insure that no part of the anvil touches the flat plate 13, as transferred vibration to the plate would, in turn, cause the potentiometer pen to malfunction.

Extending outwardly from a base plate 21 of my marker 16 is a flange 22 which is provided with holes 23 for receiving screws 24 which engages correspondingly threaded holes 25 in the bracket 12 of the outer potentiometer frame to affix my marker to the potentiometer. The holes 23 in the marker flange are aligned with the anvil, and the threaded holes 25 of the potentiometer are aligned with cut-outs in the potentiometer so that when assembled, the anvil rests in the cut-outs of the potentiometer aligned with its pen. The flange 22 is positioned on the base plate 21 at the required distance below the anvil to cause the anvil face to rest flush with the surface of the flat plate or writing table 13 of the potentiometer and allow the graph paper 14 to rest on and pass over the anvil exactly as it passes over the potentiometer writing table 13.

The indicator marker 16, in addition to having a base plate 21, flange 22 and anvil 20 is provided with a solenoid 26, an L bar 27, a spring 28, a numbering ratchet 29 and a spring controlled ratchet steadying means 30.

The solenoid 26 is secured to a bracket 31 which is attached to the base plate 21. The solenoid is provided with a reciprocable plunger 32, which is motivated by the energization of the solenoid to move into and align itself with the solenoid. One end of spring 28 is held by pin 33 to the base plate and the other end is secured to one end of link 34. The other end of link 34 is pivotally held by pin 35 to the end of the plunger 32 removed from the solenoid. Thus when the plunger enters the solenoid, the spring 28 is extended and when the solenoid is de-energized, the spring, through its link connection, retracts the plunger outwardly from the solenoid. An electric plug 36 is provided, which is electrically connected through a push button switch 37, which remains closed as long as it is pressed to the solenoid coil. Thus, after engaging plug 36 to an electric current supply source and pressing the switch button, the solenoid pulls its plunger into its central opening and holds it there until the button is released and current stops and then the spring 28 retracts the plunger.

The L bar 27 is provided with an upstanding arm 38 and an outstanding arm 39 and is pivotally held by pin 40 to the base plate 21. The upstanding arm 38 and the link 34 are pivotally held together by pin 41. An elastic plastic or rubber bumper 42 is positioned on the side of arm 38 in the vicinity of its upper end and a stop stud 43 is secured to the base plate to limit the spring contraction and the retraction of the solenoid plunger. The end of the outstanding arm 38 of the L bar rotatably supports the shaft 44 on which is mounted the numbering ratchet 29, which is of normal construction and which is comprised of a pair of ratchet wheels 45, a pair of numbering wheels 46 and a reset means 47. In order to provide a better machine, the L bar is formed of identical L's set apart by spacers and held together by screws. The ratchet and numbering wheels 45 and 46 respectively are carried between the L's as is the end of link 35 and the reset knob 48 of the reset means 47 is positioned above the upper L bar.

Also positioned on the L bars is the spring controlled ratchet steadying means 30 which is comprised of a pair of coiled tension springs 48 and a pair of tension bars 49, which are rotatably pivoted at 50 to the outstanding arm 39 of the L bar. One end of each spring is secured at 51 to the upstanding arm 38 and the other end to an end of one of the angled tension bars. The face end of each tension bar is provided with a hook 52 which rests against a ratchet tooth of a ratchet wheel and holds it under tension, permitting normal clockwise rotation of the ratchet and numbering wheel but preventing their counter-clockwise movement and holding the ratchet and numbering wheels in marking positions.

A bar or arm 53 is pivotably supported at one end by pin 54 extending from the base plate and its other end carries pin 55. Pivotably positioned on pin 55 is an inverted U shaped element 56 whose back 57 rests parallel with the pin 55 and whose sides 58 extend downwardly in ring form and encircle and ride on shaft 44. A ratchet pawl 59, which cooperates with the ratchet wheel 45, is carried by pin 55 inside the U. A coiled spring 60 rests about the pin 55 and one of its ends bears against the U back 57 and its other end presses against the rear of the pawl 59 and keeps the pawl in contact with the ratchet wheel 45.

The mechanism heretofore defined functions under the urgings and force of the solenoid and springs as follows: When the solenoid pulls its plunger to the right the L arm 38 follows and the arm 39 swings arcuately about the pin 40 and forces the numbering wheel downwardly striking the anvil 20 and marking the graph paper 14 resting thereon and as the ratchet wheel also travels downwardly, the pawl 59 carried on bar 53 slides counter-clockwise over the ratchet wheel and engages one of its teeth; and when the solenoid is de-energized and the spring 28 takes over, it retracts arm 38 of the L bar and pulls arm 39 upwardly away from the anvil and raises arm 53, thus forcing the pawl upwardly and forwardly and rotating the ratchet wheel one tooth and the numbering wheel one number.

Shafts 61 and 62, which are positioned respectively to the left and right and above the anvil, are rotatably supported by the base plate. Shaft 61 extends either side of the base plate, the rear extension providing an easy gripping means for rotating the shaft which carries on its upper extension, coiled spring 63 and spool 64, which has rolled thereon a portion of an inked ribbon 65. Shaft 62 extends above the base plate and carries coiled spring 66 and spool 67 and a portion of inked ribbon 65. The ribbon also extends between the spools and is suspended above the anvil 20. To keep the ribbon from resting on and dirtying the graph paper a springy tension arm 68 is provided which permits the numbering wheel to force the ribbon into contact with the graph paper, but which raises the ribbon off the paper as soon as the numbering wheel retracts. The shaft 62 is also provided with a threaded cap 69 to permit removal of the spool 67 and to advance the ribbon when desired so that the numbering wheel can print clearly. Shaft 61 is provided with screw 70 to releasably retain spool 64. The springs 63 and 66 serve to hold spools 64 and 67 respectively from vibration and undesired rotation.

A cover 71, which extends over and shields the solenoid and part of the mechanism, is secured to the base plate by means of upstanding threaded posts 72 and knurled screws 73 which extend through holes in the cover.

An electric light socket 74, secured to the upper surface of the cover 71, is protected by a casing 75 which is held by screw 76 to the cover 71. The light socket 74 is electrically connected to the plug 36 through a toggle switch 77 which is secured to the rear of the base plate, thus providing good visibility for observing the indicator markings.

Although two numbering wheels and two ratchets have been shown, the device could have been formed with a single ratchet and one numbering wheel. As no claim to invention is made for the cofunctioning of the two numbering wheels to permit numbering to 99, the elements providing for the interaction of the two numbering wheels have not been described or drawn.

The indicator marker mechanism is structurally simple, inexpensive, compact and easily assembled onto the potentiometer. In addition, it functions quietly without disturbing the potentiometer or its pen. This is due to the arrangement and positioning of the marker elements and the fact that the marker is attached to an outer housing and not to the functioning parts of the potentiometer and that any vibration caused by the numbering wheels striking the anvil is transferred to and absorbed by the outer housing.

Special attention should be given to the cooperation of mechanism involving the L bar 27, arm 53 and arm 49 and the mechanism for controlling the advancement and steadying of the ratchets and numbering wheels so that a clear number is printed without undue vibration.

Attention is also directed to the simplicity of the ribbon holding means which permits its manual control.

The mechanism heretofore described permits the user to mark the potentiometer graph paper at any desired instant simply by pressing the push button of switch 37. This is of great value as it is important to correlate various parts of the potentiometer graph with the physical aspects of the test being made. As an example, the potentiometer with the indicator marker attached is secured to an automobile drive shaft to record a speed-time test of travel through city streets. The graph of the potentiometer records the speeds and the marker indicator is pressed as the car passes landmarks such as intersections. Thus the graph paper shows the speed of the car at the various intersections, simply by decoding the numbers marked into the landmarks for which the numbers refer and by measuring the graph elevations at the position of the number.

It should be understood that while I have illustrated and described the preferred embodiment of my invention, I do not limit myself to the precise construction herein disclosed and the right is reserved to all changes and modifications coming within the scope of the invention as defined in any of the appended claims.

Having thus described my invention, what I claim as new and desire to secure by United States Letters Patent is:

1. An indicator marker suitable for use with a potentiometer comprised of,
   a motivating means having a solenoid, a switch therefor and a coiled first spring, said solenoid upon the application of electrical energy being capable for forcing its plunger in one direction and expanding the first spring, and the spring capable of contracting and returning the plunger to its original position upon the de-energization of the solenoid, said switch being electrically connected to said solenoid and capable of opening and closing a source of current to said solenoid, a linkage having a link and an L shaped bar, said L bar being rotatably, reciprocably supported at the vicinity of the juncture of its arms, said link being pivoted at one end to the upright arm of the L bar and secured to the spring and its other end pivoted to the solenoid plunger, a numbering means having a ratchet wheel and pawl therefor and a numbering wheel having consecutive numbers on its face, said ratchet wheel and numbering wheel secured together and rotatably supported on said horizontal L bar arm, a second arm, an inverted U shaped yoke and a second coiled spring, said second arm pivoted at one end and its other end pivotably carrying said inverted U shaped yoke, the legs of the U terminating in rings supported adjacent and either side of the ratchet wheel by the horizontal arm of the L bar, said pawl being supported by the inverted U within its legs and said second coiled spring being supported by the inverted U and bearing against it and the pawl to hold the pawl against the ratchet wheel, a steadying means having a third spring and a third bent arm, said third bent arm pivoted intermediate its ends to the horizontal arm of the L bar and one of its ends hook shaped and its other end being pinned to the third spring, said third spring being secured at one end to the upright arm of the L bar and said hooked end of the third arm engaging said ratchet wheel and steadying it and preventing its rotation contrary to the rotation normally produced by the pawl, an anvil positioned to intercept the numbering wheel at the end of its travel when the solenoid is energized causing its plunger to centralize in the solenoid coil and the L bar to swing an arc and the L bar horizontal arm to move downward with its numbering wheel, and the length of the stroke of the plunger, the pivotal positions of the L bar and second arm, the location of the ratchet wheel on the L bar and the pawl on the second arm being so interrelated that when the plunger centralizes in the solenoid coil and the L bar horizontal arm has completed its travel downward the pawl has travelled over one tooth on the ratchet wheel and settled against the next tooth and when the first spring retracts the plunger and the L bar horizontal arm has completed its travel upward the ratchet wheel and the numbering wheel are rotated by the pawl to advance one number to a position facing the anvil.

2. A numbering device as defined in claim 1 and having in addition a pair of spools and a tension arm, said spools each suitable for containing an inked ribbon and said spools spaced and positioned at either side of the anvil and said tension arm positioned between the anvil and one spool and above the anvil and normally capable of holding the inked ribbon above the anvil but permitting the numbering wheel to press the inked ribbon downward onto the anvil.

3. An indicator marker as defined in claim 1 and having in addition a base plate and a bracket, said bracket secured to and supporting the base plate and secured to the outer frame of a potentiometer and said base plate supporting said solenoid, anchoring one end of said first spring, supporting the L bar, supporting said second arm and anvil spools and tension arm.

References Cited by the Examiner
UNITED STATES PATENTS

| | | | |
|---|---|---|---|
| 1,083,580 | 1/1914 | Zenke | 346—106 X |
| 2,148,861 | 2/1939 | Kall | 346—94 X |
| 2,364,345 | 12/1944 | Cooper | 101—85 X |
| 2,544,919 | 3/1951 | Dueringer | 346—50 X |
| 2,922,686 | 1/1960 | Cross | 346—20 X |
| 3,173,359 | 3/1965 | Turner | 101—79 |
| 3,211,371 | 10/1965 | Bolger | 346—94 X |

RICHARD B. WILKINSON, *Primary Examiner.*

J. W. HARTARY, *Assistant Examiner.*